Oct. 8, 1963  C. J. SLETTEN  3,106,708
MEANS FOR OBTAINING FOR TRICOORDINATE RADAR INFORMATION
Filed Nov. 18, 1958  2 Sheets-Sheet 2

INVENTOR.
CARLYLE J. SLETTEN
BY
ATTORNEYS

United States Patent Office 3,106,708
Patented Oct. 8, 1963

3,106,708
MEANS FOR OBTAINING TRICOORDINATE
RADAR INFORMATION
Carlyle J. Sletten, Acton, Mass., assignor to the United States of America as represented by the Secretary of the Air Force
Filed Nov. 18, 1958, Ser. No. 774,785
3 Claims. (Cl. 343—16)
(Granted under Title 35, U.S. Code (1952), sec. 266)

The invention described herein may be manufactured and used by or for the United States Government for governmental purposes without payment to me of any royalty thereon.

This invention relates to a new antenna and radar technique which simplifies acquisition of electronic range-azimuth-elevation coordinate information.

Most of the present day search radars are two-dimensional, measuring range and azimuth coordinates. The same coverage and data rates are now obtainable by the use of this invention on a three-dimensional system utilizing the same power source and a similar antenna. With the instant invention the obtaining of tricoordinate radar information may be achieved with only minimum modification of present receiving and indicating devices.

V-beam and multilobe antennas may provide tricoordinate information while searching sizeable angular areas; however, complex antenna installations and electronics are necessary. For example, a V-beam antenna usually requires two reflectors and two transmitters to produce two fan shaped patterns while multilobe antennas require many terminals to obtain angular accuracy in the elevation plane.

The technique developed in this invention involves the phase comparison of signals from two receiving terminals of an antenna for the elevation coordinate while azimuth and range coordinates are obtained in the usual manner.

Accordingly, it is an object of this invention to produce a novel method and means for directly obtaining accurate, electric range, azimuth and elevation data.

Another object of this invention involves a novel system for obtaining tricoordinate radar information wherein nearly hemispherical elevation coverage is realizable with shaped fan beams.

Still another object of the invention is the production of a novel system for tricoordinate radar wherein only one transmitter and two receivers are used with a single reflector surface.

A further object of this invention involves the extraction of height data by phase comparison of nearly equal signals wherein signal scintillations may be erased by amplitude limiting.

A still further object of the invention involves a system for obtaining tricoordinate radar information wherein ground clutter may be cancelled by phase-nulling all targets at 0° elevation.

It is another object of this invention to produce a novel system for obtaining tricoordinate radar information wherein it is possible to null out jamming signals at fixed elevation angles.

It is still another object of this invention to produce a novel height finder system which can operate at very large ranges on aircraft equipped with transponder beacons, is free from ground clutter interference and, therefore, useful with air traffic control.

It is a further object of this invention to measure elevation angle by means of phase function which may be controlled by slot spacing along the feeding array. This relative phase function may be made linear with elevation angle and is invariant with azimuth angle.

It is a still further object of the invention to provide a tricoordinate radar system wherein the normal two-dimensional coverage is augmented for height information by a second received coverage pattern that increases height coverage and decreases clutter content.

Another object of this invention involves the control of the electrical phase-in-space of a search pattern by design as a function of the angle of the pattern interval of an antenna.

Still another object of this invention involves accurate measurement of electrical phase during radar search on traveling wave antennas to yield an angular coordinate on received signals.

A further object of this invention relates to a tricoordinate radar system wherein large angular intervals may be swept in a given time with a high information rate utilizing an antenna having one terminal on transmission and two terminals on receiving.

A still further object of this invention involves the utilization of primary phase comparison in a tricoordinate radar system whereby signals may be amplified non-linearly, relative phase is preserved on heterodyning and amplitude may be adjusted for optimum coverage.

Still another object of this invention involves the accomplishment of place comparison in wide angle beam patterns such as fan and $csc^2 \theta$, which enables the utilization of information at a high rate while searching.

Additionally, an object of this invention involves a tricoordinate radar system which is economical to operate and build from currently available, commercial components which lend themselves to standard mass production manufacturing techniques.

These and other advantages, features and objects of the invention will become more apparent from the following description taken in connection with the illustrative embodiments in the accompanying drawings, wherein.

Some of the operational requirements for a tricoordinate radar system are a minimum of 30° of elevation coverage preferably $csc^2 \theta$ in shape, and, to be usable, signals must benefit from the gain of the antenna reflector and be above the noise levels. If two signals are to be compared, phase comparison is deemed more useful than amplitude comparison because the large amplitude gradient needed for accuracy in amplitude comparison is contingent on weakening of one signal with respect to the other. This means that over a fairly small angular region, at least one of the signals must rapidly approach noise level. Amplitude comparison also requires preknowledge of the dynamic response of the receiver amplifiers over extreme fluctuations in signal levels. Although this invention is described relative to the preferred phase comparison, amplitude comparison is not excluded from the basic concept of a tricoordinate radar.

The novel antenna principle of my invention may be used to meet the above operational requirements for obtaining tricoordinate radar information at a high data rate. A single antenna may be utilized to produce two overlapping $csc^2 \theta$ beams from a single reflector with the relative phase variation between the two beams a monotonic function of elevation.

Figure 1:
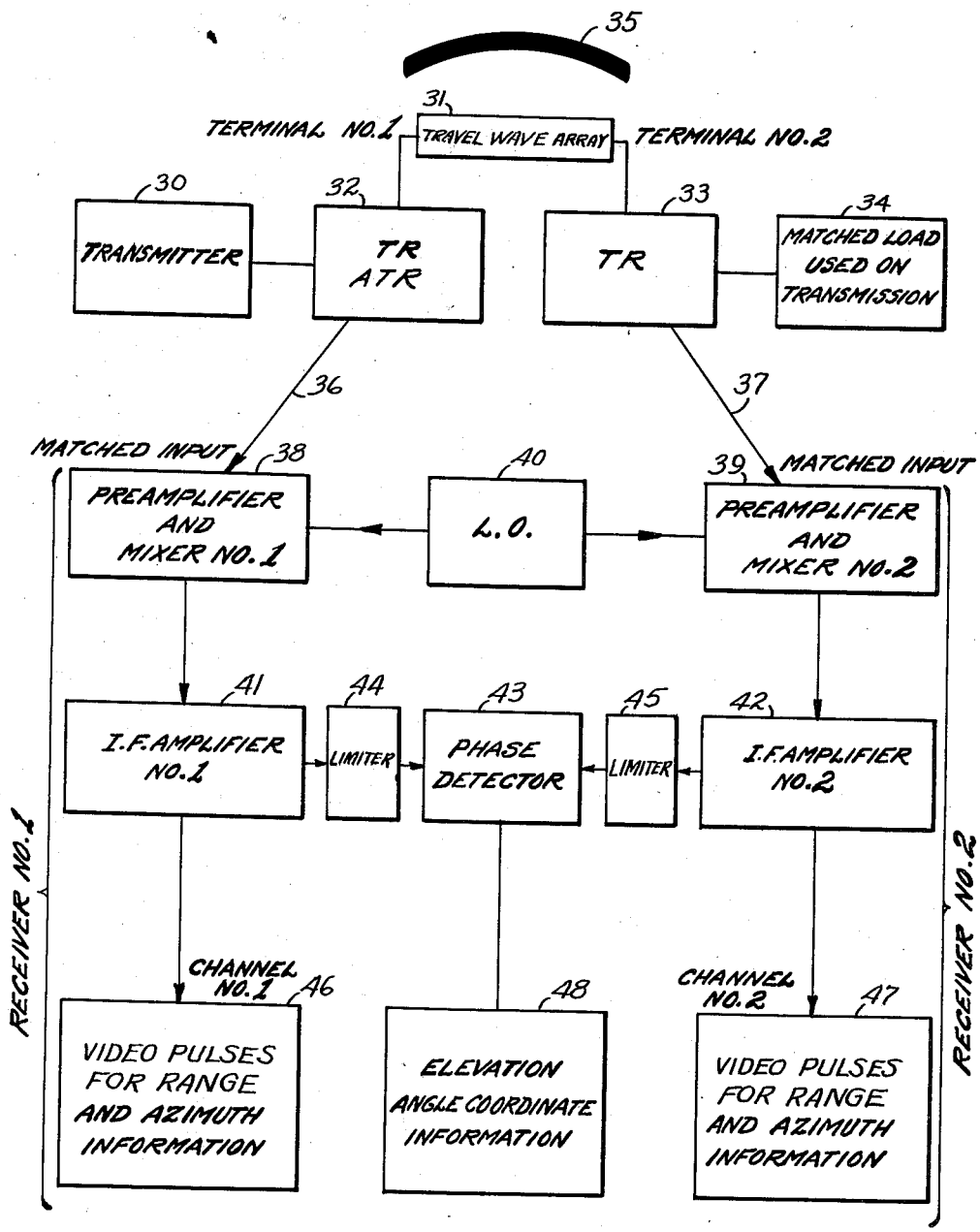
FIGURE 1 is a block diagram of an antenna in a tricoordinate radar system.

The block diagram of FIGURE 1 shows how the signals from the two ends of an array 31 may be used to obtain tricoordinate radar information. Array 31 has associated therewith terminals No. 1 and No. 2, hereinafter referred to as terminals $T_1$ and $T_2$, respectively. The single transmitter 30 feeds the traveling-wave array 31 at terminal $T_1$, the feed terminal. The TR, ATR and TR switches 32 and 33 prevent the microwave pulses or ultra high frequency transmitted energy from feeding back into the two sensitive receivers fed by lines 36 and 37 respectively. Upon transmission of energy from source 30, the radiated power is passed through TR, ATR switch 32 to terminal $T_1$, of travelling-wave array 31 and is radiated out therefrom to reflector 35. Simultaneously a portion of the radiated power passes through TR switch 33 and is absorbed in matched load 34. A fraction of the transmitted power, usually 20 to 25 percent, although not limited thereto, is thereby dissipated in matched load 34. Upon receipt of a return signal, TR, ATR switch 32 passes the aforesaid signal to receiver No. 1 by way of line 36 and also prevents said signal from entering transmitter 30. Simultaneously, the return signal is passed by way of TR switch 33 to receiver No. 2 by way of line 37. Receiver No. 1 is comprised of preamplifier and mixer 38, local oscillator 40, I.F. amplifier 41 and video detector 46. Receiver No. 2 is comprised of preamplifier 39, local oscillator 40, I.F. amplifier 42 and video detector 47. Video detectors 46 and 47 are conventional radar detectors, each of the outputs thereof being connected to its associated conventional radar indicator. The inputs as seen looking from terminals $T_1$ and $T_2$ toward their respective receivers, must be matched to the characteristic impedance of the waveguide or transmission line used on the travelling-wave array. A common local oscillator 40 is used for both receiver channels so that the relative phase between the received signals in channels No. 1 and No. 2 will be preserved after heterodyning. The phase detector 43 may be of any convenient type; however, an electronic output that can be fed to a computer is preferable. The range and azimuth information is obtained in the usual manner, as can be seen by the block diagram, while the elevation angle is determined as a function of the phase difference between channels 1 and 2.

It is possible to convert the phase differences between the two terminals of the array into an electronic output signal representative of the elevation angle. The antenna may be designed so that there is only one wavelength of phase shift over the entire elevation sector; there are then no ambiguities, and simple phase comparator 43 is used. Limiters 44 and 45 can take out amplitude variations before the signals from the two channels are applied to phase detector 43. Although target scintillation will cause large variations in signal strength, the signals will vary simultaneously on the two channels.

If the elevation angle in a 36° elevation sector is to be accurate to 0.1°, it is apparent that the phase angle measurement must be accurate to 1°. Several methods can be used to improve height-finding accuracy. For example, the phase function is designed so that its slope is more rapid near the horizon than at higher elevation angles. This improves the accuracy on distant targets where it is needed most.

In another embodiment of the present invention, not illustrated but utilizing the same concepts, a radar can also be operated on two frequencies fairly remote from each other, such that on the lower frequency the phase difference between terminals is no more than one wavelength over the elevation sector. The phase function produced by the line source is a slow function of frequency which allows a change in phase shift for a particular angular sector. After a coarse elevation is determined, the radar is operated on a higher frequency that allows ambiguities but permits targets to be tracked continuously while scanning. Alternatively, the transmitted pulse can be marked in some way. The most obvious suggestion is to introduce a linear variation in frequency during the pulses. Then when the signals from the two channels are allowed to interfere they generate an audio or kilocycle frequency, depending on the path difference between the two channels. (It may be noted that all Doppler frequencies will be absent because interfering signals are identical except for relative phases and ground clutter content.)

The antenna used with the block diagram of FIGURE 1 comprises a lens or reflector to produce a focal plane, preferably with a wide angle, and an array or extended primary radiator where the phase between elements is controllable. The combination of the line source and reflector gives a fan or $csc^2 \theta$ shaped beam.

Figure 2:
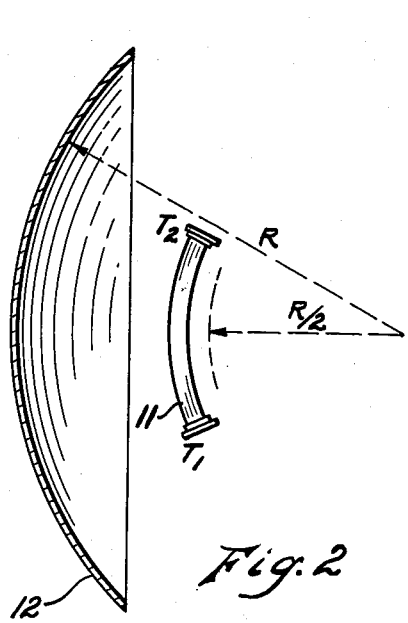
FIGURE 2 is an end view of a cross section of a schematic representation of one form of antenna with a spherical reflector usable with the block diagram of FIGURE 1.
Figure 3:
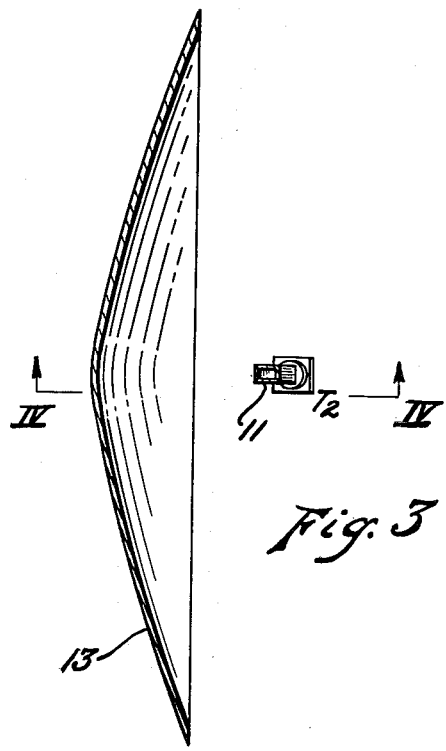
FIGURE 3 is an end view of a cross section of a schematic representation of an alternative form of antenna with a parabolic torus reflector.
Figure 4:
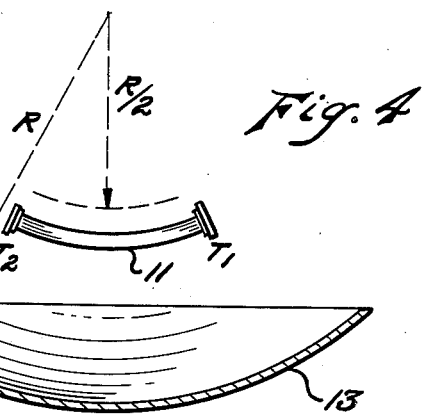
FIGURE 4 is a plan view of a cross section along line IV—IV of FIGURE 3.

FIGURES 2, 3 and 4 show schematically cross sections of some of the various antennas which comprise reflectors and line sources which are suitable for use with the block diagram of FIGURE 1. This comparative phase of the energy received on the two terminals of the traveling-wave arrays feeding the reflector or lens is related only to the phase function built into the array and not to factors exterior to the line source.

FIGURES 2, 3 and 4 show a curved 18-element slot array 11 properly located in the focal region of a spherical reflector 12 and a parabolic torus reflector 13.

The principle of the device is most simply introduced by describing its operation in a 2-element line source. When a single radiator is located on a radius R of a sphere, slightly closer than $R/2$, the paraxial focus, to the sphere surface, it produces a pencil beam. Because of the wide focal region of the sphere, a beam or pattern almost identical with that of the single radiator is produced when another source is located anywhere on the circle or sphere passing through the first radiator and having a center in common with the sphere. If these radiators are stacked in the vertical plane and brought close enough together so that their antenna beams overlap, the combined amplitude pattern of the two will depend on (1) the separation between radiators, (2) the individual patterns, (3) the relative electrical phase of the radiators, and (4) the relative coupling of the radiators to the feeding guide. With the spacing and individual pattern characteristics fixed, the combined amplitude pattern is not very sensitive to phase variation. The phase between the two radiators can be varied from $-45°$ to $+45°$ from the in-phase condition without greatly modifying the sum pattern, and the variation must exceed 90° before it can cause destructive interference between the two patterns.

For the purpose of explaining the device, assume that only two radiators, called $S_1$ and $S_2$, are fed by a single transmission line terminated by a matched load, and the loading of $S_1$ and $S_2$ on the feeding transmission line is small, then $S_1$ will be excited in phase before $S_2$. If the input source is replaced by a matched load and the input fed at the matched terminal, then $S_2$ will be excited before $S_1$. A signal from a given direction in the angular region where the patterns overlap will excite both $S_2$ and $S_1$. The relative phase path inside the feeding line from $S_1$ and $S_2$ to receivers placed at $T_1$ and $T_2$ is different, as can be seen by applying the reciprocity principle to the transmitting case. If $S_1$ and $S_2$ are initially in phase, ideally there will be no relative phase variation between outputs at $T_1$ and $T_2$ for reflectors having focusing ability. Since the amplitude of one receiving element differs from the amplitude of the other at a given angle $\theta$, the phase variation with angle is nearly linear when $S_1$ and $S_2$ are fed slightly out of phase. This can be seen by compounding the (time) vectors representing the signals from $S_1$ and $S_2$ at a given terminal. To obtain the phase function of interest, the vector sum of $S_1$ and $S_2$ at $T_1$ is compared with the vector sum of $S_1$ and $S_2$ at $T_2$ as a function of angle.

In the device, spacing of the elements of the feeding waveguide controls the phasing and excitation at the radiators. The amount of excitation at each radiator is adjusted to get a desired coverage pattern in the elevation plane. The relative phase-in-space function between terminals is largely determined by the longitudinal spacing of the radiators on the feeding line. With shunt slots in the broad face of the waveguide, transverse displacement of the slots from the center line controls the coupling.

Figure 5:
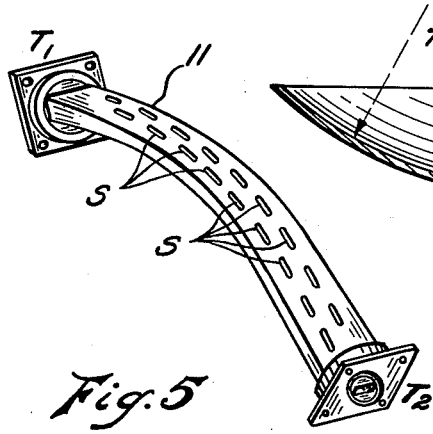
FIGURE 5 is a pictorial view of a circular feed usable with either a spherical or parabolic torus reflector.

FIGURE 5 shows an 18 element waveguide which comprises the circular primary feed which is mounted just inside the paraxial focus. Terminal $T_1$ illuminates all targets and receives the identical pattern that it transmits. Terminal $T_2$ does no transmitting; it receives energy from the targets illuminated by $T_1$, its pattern being the function of gain vs. elevation. If $T_1$ and $T_2$ could each see the same pattern alike, there would be no problem. The two patterns are different, however, and cannot be adjusted independently. Solutions are (1) to make either pattern whatever we please, provided we are willing to accept its reverse-flow version at the other terminal; (2) select a compromise pattern according to some height-coverage criteria; or (3) adjust the amount of power going into the matched load.

Taking the third method, it was found that in the limit when 100 percent of the power is put into the matched load (zero loading of the radiators to the line) the patterns as seen from both terminals are identical and the desired relative radiated power distribution is made approximately $csc^2 \theta$. Approximately 20-25% of absorption of the transmitted power represents a change in the pattern of transmission from travelling-wave array 31 and thus also a change in the pattern of the received power which therefore represents a compromise in the aforesaid patterns for both phase and amplitude. With a spherical reflector, elevation angle is linearly related to arc length on the line feed thus establishing a constant longitudinal spacing of the radiating elements for a linear phase in space vs. elevation angle. Because the relative phase is measured between two terminals, it is twice the phase shift per slot as seen between the ends of the array. Transverse displacement of each slot is utilized to achieve the proper coupling. The radiator is shaped to fit the focusing surface and variation in pattern shape is adjusted by varying the coupling.

MTI techniques for reducing ground clutter are unnecessary with the device of the present invention since a transponder on the targets of interest may be used, especially in air traffic control operations. Without a transponder, however, use is made of the fact that the two signals from the end of the array can be cancelled at 0° in elevation. The phase shift vs. angle can be adjusted with the line lengths between the antenna and receivers or by the phase of local oscillator injections between receivers such that targets very near 0° in elevation will be effectively cancelled. Thus ground clutter can be nulled and its phase used as a reference phase for 0°. A slow acting feedback loop between the average video output originating from ground targets and the relative phase between channels can be used to compensate for changes which may be introduced by the circuit or the axis of rotation.

The combination of lens or reflector with a primary feed with adjustable phase and the circuitry of the block diagram of FIGURE 1 allows for the addition of a height information to normally two-dimensional radar coordinate systems.

Although the invention has been described with reference to particular embodiments, it will be understood to those skilled in the art that the invention is capable of a variety of alternative embodiments within the spirit and scope of the appended claims.

What is claimed is:

1. A radar system comprising a traveling wave antenna array located in the focal plane of a reflector, means to energize said traveling wave array to provide a single transmitted $csc^2 \theta$ beam to be directed towards an airborne target, said energizing means also operating to produce a receiving pattern of two simultaneous overlapping $csc^2 \theta$ beams with the relative phase between the two aforesaid beams a montonic function of the elevation of said airborne targets, and means to phase compare the simultaneously received energy in each of said pair of said $csc^2 \theta$ beams to each other to provide an output signal representative of the angle of elevation of said airborne targets.

2. A radar system as defined in claim 1 also including additional means to video detect the simultaneously received energy in each of said pair of $csc^2 \theta$ beams for visual presentation.

3. A radar system as defined in claim 1 wherein said energizing means include a transmitter connected to one terminal of said traveling wave antenna array by way of ATR means, and a matched load connected to another terminal of said traveling wave antenna array by way of TR means.

References Cited in the file of this patent

UNITED STATES PATENTS

| | | |
|---|---|---|
| 2,659,006 | Herb | Nov. 10, 1953 |
| 2,689,305 | Riblet | Sept. 14, 1954 |
| 2,747,178 | Alexander et al. | May 22, 1956 |
| 2,845,622 | Gamble | July 29, 1958 |
| 3,001,193 | Marie | Sept. 19, 1961 |